United States Patent Office 2,805,984
Patented Sept. 10, 1957

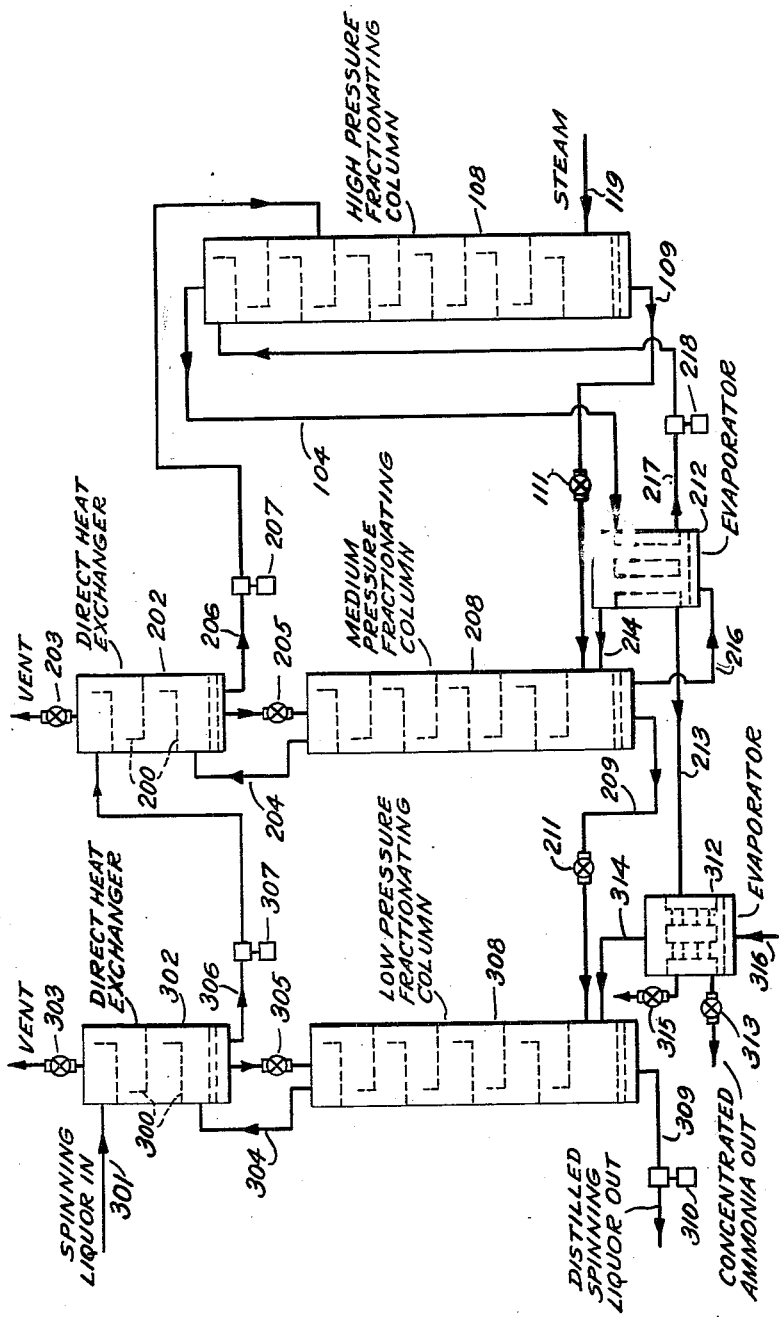

2,805,984

PROCESS FOR DISTILLING CUPRAMMONIUM RAYON USED SPINNING LIQUORS

John C. St. Clair, Madison County, Ohio

Application July 9, 1956, Serial No. 596,530

3 Claims. (Cl. 202—46)

This invention relates to a process for the distillation of ammonia from dilute cuprammonium rayon and spinning liquors.

In the cuprammonium rayon process cellulose is dissolved in a mixture containing ammonia. The resulting cellulose solution is extruded or spun into a relatively large volume of liquid that precipitates the cellulose as fibers and produces large volumes of dilute used spinning liquors. The dilute used spinning liquors, which are usually referred to as "blue water," are mostly all water and contain from 0.01% to possibly 0.3% ammonia.

In a cuprammonium rayon plant the loss of ammonia in the dilute used spinning liquor can easily amount to as much as a half million dollars a year. Although it can be recovered, prior processes are so expensive that its recovery is not known to be practiced anywhere in this country. The common practice of dumping the ammonia bearing waste spinning liquor into streams is objectionable in that ammonia is quite toxic to fish and ammonia can cause difficulties to cities and industries down stream who use water from the stream.

The ammonia has been recovered by distillation at one plant in Germany, but because of the high dilution a vast amount of water must be distilled and in prior processes enormous equipment must be used. The Haltmeier process (PB19583, Offices of Technical Services, U. S. Department of Commerce), which is the only process known to have been used, has the disadvantages of (1) the distillation is conducted under low vacuum with a resulting high cost for the distilling columns, (2) the concentrated ammonia product must first be condensed by refrigeration and then finally redistilled, and (3) a very large and expensive amount of heat transfer surface is necessary to provide reasonable heat economy.

The present invention aims to provide an improved multiple-effect distillation system for recovering ammonia from cuprammonium rayon used spinning liquors, wherein low equipment and heat costs are obtained by the use of efficient methods for heating the feed liquid to the system and cooling the bottom and top products therefrom.

Another object is to provide a system for fractionally distilling cuprammonium used spinning liquors in which the feed liquid is divided into a plurality of similar lquid feed streams that are simultaneously fractionated in separate fractionating columns at different pressures, in which vapors from the columns at lower pressures are absorbed in the feed liquid to the columns at higher pressures, thus condensing said vapors and heating said feed liquid, and in which bottom products from the columns at higher pressures are colled and partially evaporated by pressure reduction (flashing) and the resulting vapors are used as stripping vapors for the columns at lower pressures. The relatively small amount of concentrated vaporous product from the top of the column at highest pressure may be conveniently condensed and cooled by using these vapors to heat evaporators producing stripping vapors for the columns at lower pressures.

The large advantages of the present invention are derived from two special properties of the cuprammonium rayon used spinning liquors being distilled. First, these spinning liquors have the property of being able to absorb considerable quantities of concentrated ammonia-steam vapors without appreciably, if at all, increasing the amount of steam subsequently required to steam strip or distill the thus heated spinning liquors. As a result spinning liquors, when used as the feed liquid to columns at higher pressure, can be first heated very cheaply by directly absorbing the top vaporous products from the columns at lower pressures, with little adverse effect on the columns at higher pressures. Second, the properties of these spinning liquors are such that the sensible heat contained in the hot bottom products from columns at higher pressures, is quite large as compared with the heat required to fractionate the spinning liquor. As a result when the hot bottom products from columns at higher pressure are flashed or cooled by pressure reduction, the vapors thus generated can cheaply fractionate relatively large quantities of additional spinning liquor at lower pressure.

Other features, objects and advantages of my invention will appear upon consideration of the following description taken in connection with the accompanying drawing in which is shown a schematic view of one form of apparatus capable of carrying out the method of my invention.

Referring more particularly to the drawing, the number 301 designates a feed line through which is passed a stream of cuprammonium rayon used spinning liquor containing ammonia. This stream may or may not contain dissolved copper salts but I usually prefer that the copper be removed prior to the present process. If this stream contains ammonia that is combined with acid it is desirable to first convert this combined ammonia to the volatile form by adding lime or waste sodium hydroxide.

The above stream passes by line 301 into direct heat exchanger 302 which in the illustration consists of an outer casing or shell defining a large internal chamber in which may be arranged baffles or trays 300 over which the incoming feed liquid gravitates in a generally downward direction. While so moving, the relatively cold liquid is brought into direct countercurrent contact with an ascending body of relatively hotter vapors from line 304 and low pressure fractionating column 308 so that these vapors practically all condense and are absorbed and thus transfer their heat of condensation directly to the feed liquid being heated. It has been found that direct heat exchangers are a relatively cheap and very efficient means for heating liquids by vapors.

The uncondensed vapors are vented by line 303. The liquid heated in direct heat exchanger 302 is divided into one stream that passes through valved line 305 and serves as the feed to the low pressure fractionating column 308 and into another stream that passes by line 306 and pump 307 into direct heat exchanger 202. Direct heat exchanger 202 is shown built similar to direct heat exchanger 302 just described. The liquid passes downwardly over plates or baffles 200 and directly counterwardly contacts an ascending body of relatively hotter vapors, from line 204 and medium pressure fractionating column 208, so that these vapors practically all condense and are absorbed by the liquid and thus transfer their heat of condensation directly to the liquid being heated.

The uncondensed vapors from direct heat exchanger 202 are vented by line 203. The liquid heated in direct heat exchanger 202 is divided into one stream that passes through valved line 205 and serves as the feed to the medium pressure fractionating column 208, and into another stream that passes out by line 206 and pump 207 and serves as the feed to the high pressures fractionating column 108.

The high pressure fractionating column 108 operates at higher temperatures and pressures than medium pressure fractionating column 208 which operates at higher temperatures and pressures than low pressure fractionating column 308. High pressure fractionating column 108 is of conventional construction consisting of a shell fitted with trays or baffles and steam is passed in at the bottom at 119. In high pressure column 108 the feed flows by gravity down the column and contacts in a counter-current manner steam passing up the column, which process is often referred to as stripping. In this way the feed is substantially freed of ammonia and the relatively pure bottom product passes by line 109 and reducing valve 111 into the bottom of medium pressure fractionating column 208.

The bottom of the medium pressure fractionating column 208 is at a lower pressure than the high pressure fractionating column 108 and as a result the bottom product from the high pressure column 108 partially evaporates on pressure reduction or flashes giving off vapors that are used to steam strip or fractionate the feed stream to medium pressure column 208.

The medium pressure fractionating column 208 is shown of conventional construction consisting of a shell fitted with trays or baffles. The feed entering by valved line 205 is counter-contacted by ascending vapors and a resulting residue or bottom product is produced substantially free of ammonia. This bottom product and the flashed, and thus cooled, bottom product from the high pressure column 108 mix in the bottom of the medium pressure column 208 and pass by line 209 and reducing valve 211 into the bottom of the low pressure fractionating column 308.

The bottom of the low pressure fractionating column 308 is at a lower pressure than the bottom of the medium pressure column 208 and as a result the two combined bottom products passing from the bottom of the medium pressure column 208 partially evaporate by pressure reduction, or flash, giving off vapors that are used to strip or fractionate the feed stream entering the low pressure column 308.

The low pressure fractionating column 308 is shown of conventional construction consisting of a shell fitted with trays or baffles. The feed entering by valved line 305 is counter-contacted by ascending vapors and a resulting residue or bottom product is produced substantially free of ammonia. This bottom product and the flashed, and thus cooled, bottom products from the other two fractionating columns mix in the bottom of the low pressure column 308 and pass out of the column by line 309 and pump 310 and form the distilled spinning liquor or residue product from the system.

Vapors from the top of the high pressure column 108 pass by line 104 to evaporator 212 where the vapors give up part of their heat and are at least partially condensed. Evaporator 212 is shown of conventional construction and may be any evaporator of the very common indirect type; that is, an evaporator in which the condensing vapors and condensate do not intermix with the liquid or vapors being evaporated. In evaporator 212 liquid, entering by line 216 from medium pressure column 208, is evaporated into vapors which leave evaporator 212 by line 214, enter medium pressure column 208 and help fractionate the feed liquid to that column.

At least part of the condensate from evaporator 212 is returned by line 217 and pump 218 to the enriching section at the top of high pressure column 108. The remainder of the condensate together with any uncondensed vapors make up the concentrated ammonia product fraction and flow from evaporator 212 through line 213 to evaporator 312 where by indirect heat transfer practically all of any remaining vapors are condensed and the liquid is cooled. Evaporator 312 is of conventional construction. In evaporator 312 water, entering by line 316 from any convenient source, is evaporated into steam which leaves evaporator 312 by line 314, enters the low pressure column 308 and helps fractionate the feed liquid to that column. Uncondensed vapor or gases are vented by valved line 315 and the concentrated ammonia product leaves the system by valved line 313.

In the cuprammonium rayon process there is a large need for heat for heating water to be used in the spinning process. The distilled spinning liquor leaving the system at 310 can very advantageously be used to heat water to be used in the spinning process.

In the drawing is illustrated a form of my invention that is preferred when good heat economy with a low expense for equipment is desired. If a system giving a minimum of expense for equipment with a fair heat economy is desired the use of only two columns is preferred. If very high heat economy is desired this may be easily obtained without undue equipment expense by using more columns, and in some cases as many as six or even ten columns operating at different pressures may be used. When a large number of columns are used the basic method of arranging columns, of heating feed liquid and of cooling products is the same as that shown for three columns with the exception that it is usually desirable to increase the size and number of evaporators transmitting heat between the columns at higher pressures.

The invention disclosed may be employed in a number of ways in complex fractionating systems. For instance in the drawing, high pressure fractionating column 108 may be considered as a separate fractionating zone, medium pressure fractionating column 208 may be considered as a separate fractionating zone and low pressure fractionating column 308 may be considered as a separate fractionating zone. Each zone of fractionation might individually consist of a group of two or more fractionating columns operating at the same or at different temperatures and pressures. Or each zone of fractionation might consist of just a single fractionation column. In all cases there would be at least two separate zones of fractionation, zones would be physically distinct from each other and different zones would operate at different temperatures and pressures.

In all cases the present invention comprises the following four basic steps:

(1) A first stream of feed liquid containing cuprammonium rayon used spinning liquor is fractionated in a first fractionating zone.

(2) A second stream of feed liquid containing cuprammonium rayon used spinning liquor is fractionaed in a second fractionating zone.

(3) A more volatile vaporous fraction from the second zone directly contacts, is absorbed in and thus heats feed liquid including said first stream of feed liquid to the first zone.

(4) A liquid residue product from the first zone is partially vaporized by pressure reduction and the vapors used to perform by direct heating and counter-current contacting action fractionation of the second feed stream in the second zone.

*Example*

For a plant desiring to fractionate 2000 gallons per minute of decoppered cuprammonium rayon used spinning liquor containing 0.07% ammonia and at 90° F., one set of operating conditions would be as follows.

In the drawing, the high pressure fractionating column 108 would operate at 49 to 52 lbs./sq. in. gage pressure and at 285 to 300° F. temperature, and fractionates approximately 20% of the feed. The medium pressure fractionating column 208 operates at 506 to 541 mm. of mercury absolute pressure and at 189 to 195° F. temperature and fractionates approximately 31% of the feed. The low pressure fractionating column 308 operates at 107 to 119 mm. of mercury absolute pressure and at 125 to 131° F. temperature and fractionates approximately 49% of the feed. A product of 51 gallons/hr. of 25% ammonia solution in water is obtained. The steam needed at 119 is 40,000 lb./hr. Approximately 67% of the feed is fractionated by vapors obtained very cheaply by flashing or pressure reduction of the bottom products from the high pressure and medium pressure columns.

The evaporators required are very small as compared with prior processes. Approximately 13% of the feed is fractionated by vapors generated by the evaporators and the temperature differences across the evaporator surfaces are large, averaging over 40° F.

Other advantages of the present invention over prior processes are the absence of expensive indirect heat exchangers necessary for heating feed liquid to and cooling bottom products from columns at higher temperatures, and the absence of refrigeration equipment for condensing the vaporous product from the part of the feed fractionated at lower temperatures.

The present invention is a large advance in the art of recovering ammonia from cuprammonium rayon used spinning liquor. Unique properties of this used spinning liquor are taken advantage of and a process has been devised that provides large economies in heat, labor and equipment.

I claim:

1. The method of recovering ammonia from cuprammonium rayon used spinning liquor containing less than 0.3% by weight ammonia and containing more than 99% by weight water which comprises: fractionally distilling in a first fractionating zone a first feed stream containing said used spinning liquor, fractionally distilling in a second fractionating zone a second feed stream containing said first-mentioned used spinning liquor, said second zone being maintained at relatively lower temperatures and pressures than said first zone, absorbing a vapor stream which is from said second zone and which is more volatile than said second feed stream in feed liquid comprising said first feed stream, generating vapors by pressure reduction of a liquid product fractionally distilled in the first zone from the first feed stream, said product being less volatile than the first feed stream and being less volatile than the second feed stream, and using said generated vapors to perform by direct heating and countercurrent contacting action fractional distillation of said second feed stream in the second zone.

2. The method of recovering ammonia from cuprammonium rayon used spinning liquor containing less than 0.3% by weight ammonia and containing more than 99% by weight water which comprises: absorbing ammonia-bearing vapors from a first fractionating column in feed liquid, feeding a portion of the feed liquid in which said vapors have been absorbed to the top of the first fractionating column, feeding another portion of the feed liquid in which said vapors have been absorbed to a second fractionating column maintained at higher pressures than said first fractionating column, recovering concentrated ammonia from the top of the second fractionating column, feeding steam into the bottom of the second fractionating column, feeding a liquid residue from the bottom of the second fractionating column to the bottom of the first fractionating column to supply heat to the first fractionating column, passing vapors from the top of the first fractionating column to said absorbing step and discarding from the first fractionating column liquid substantially freed of volatile ammonia.

3. The method of recovering ammonia from cuprammonium rayon used spinning liquor containing less than 0.3% by weight ammonia and containing more than 99% by weight water which comprises: absorbing ammonia-containing vapors from a first fractionating zone in feed liquid, feeding a portion of the feed liquid in which said vapors have been absorbed to the first fractionating zone, feeding another portion of the feed liquid in which said vapors have been absorbed to a second fractionating zone maintained at higher pressures than said first fractionating zone, recovering concentrated ammonia from the second fractionating zone, feeding steam into the second fractionating zone, feeding a liquid residue from the second fractionating zone to the first fractionating zone to supply heat to said first zone, passing to the absorbing step vapors that are a product of the first fractionating zone and that contain a higher percentage of ammonia than feed liquid to said first zone and discarding from the first fractionating zone liquid substantially freed of volatile ammonia.

References Cited in the file of this patent

UNITED STATES PATENTS

| 2,148,712 | Reich | Feb. 28, 1939 |

FOREIGN PATENTS

| 564,876 | Germany | Nov. 24, 1932 |
| 744,939 | Germany | Dec. 6, 1944 |